(12) United States Patent
Brits et al.

(10) Patent No.: US 6,630,806 B1
(45) Date of Patent: Oct. 7, 2003

(54) SYSTEM FOR CONTROLLING A ROTARY DEVICE

(76) Inventors: Ludwig Emma Brits, 32A Sterling Street, Manunda, QLD 4870 (AU); Victor John Christie, 8 Longden Street, Brinsmead, QLD 4870 (AU)

(*) Notice: Subject to any disclaimer, the term of this patent is extended or adjusted under 35 U.S.C. 154(b) by 0 days.

(21) Appl. No.: 09/831,169
(22) PCT Filed: Nov. 4, 1999
(86) PCT No.: PCT/AU99/00962
§ 371 (c)(1),
(2), (4) Date: Jul. 13, 2001
(87) PCT Pub. No.: WO00/28656
PCT Pub. Date: May 18, 2000

(30) Foreign Application Priority Data

Nov. 6, 1998 (AU) .............................. PP6961

(51) Int. Cl.⁷ ................................. H02P 6/16
(52) U.S. Cl. ...................... 318/439; 318/254
(58) Field of Search ................. 318/138, 254, 318/439, 700, 720–724

(56) References Cited

U.S. PATENT DOCUMENTS

| 1,908,364 | A | * | 5/1933 | Kern |
| 2,414,787 | A | * | 1/1947 | Post |
| 2,870,388 | A | * | 1/1959 | Thomas |
| 3,327,185 | A | * | 6/1967 | Kawada |
| 3,333,171 | A | * | 7/1967 | Platnick |
| 3,350,615 | A | * | 10/1967 | Lindner |
| 3,466,519 | A | * | 9/1969 | Platnick |

* cited by examiner

Primary Examiner—Bentsu Ro
(74) Attorney, Agent, or Firm—James Ray and Associates (57) ABSTRACT

A system for controlling a rotatable device, the system comprising a controller and a rotary device, which has a stator and rotor, wherein the controller is connected to the rotary device to control rotation of the rotary device, and wherein the controller is adapted to periodically energizes at least one energizing coil of the device to create a magnetic field of a polarity which induces the rotor to rotate in a single direction and wherein the controller is switched off so as to de-energize the energizing coil when other forces, being forces other than those resulting from the energized energizing coil, produce a resultant force which induces rotation of the rotor in the single direction.

18 Claims, 9 Drawing Sheets

SYSTEM FOR CONTROLLING A ROTARY DEVICE

FIELD OF THE INVENTION

The present invention relates to motors which are used for generating a torque and generators which are used for generating electricity.

BACKGROUND OF THE INVENTION

A typical electric motor consists of a stator and rotor.

The operation of an electric motor is based on the principal that an electric current through a conductor produces a magnetic field, the direction of current in an electromagnetic such as a coil of wire determines the location of the magnets poles and like magnetic poles repel and opposite poles attract.

The stator which is typically called the field structure establishes a constant magnetic field in the motor.

Typically the magnetic field is established by permanent magnets which are called field magnets and located at equally spaced intervals around the rotor.

The rotor or armature typically consists of a series of equally spaced coils which are able to be energised to produce a magnetic field and thus north or south poles.

By keeping the coils energised the interacting magnetic fields of the rotor and the stator produce rotation of the rotor.

To ensure that rotation occurs in a single direction a commutator is typically connected to the windings of the coils of the rotor so as to change the direction of the current applied to the coils.

If the direction of the current was not reversed the rotor would rotate in one direction and then reverse its direction before a full cycle of rotation could be completed.

The above description typifies a DC motor. AC motors do not have commutators because alternating current reverses its direction independently.

For a typical AC motor such as an induction motor the rotor has no direct connection to the external source of electricity. Alternating current flows around field coils in the stator and produces a rotating magnetic field. This rotating magnetic field induces an electric current in the rotor resulting in another magnetic field.

This induced magnetic field from the rotor interacts with the magnetic field from the stator causing the rotor to turn.

An electric generator is effectively the reverse of an electric motor. Instead of supplying electricity to coils of either the stator or rotor, the rotor or armature is rotated by physical forces produced by a prime mover.

In effect a generator changes mechanical energy into electrical energy.

SUMMARY OF THE INVENTION

The present invention is aimed at providing an improved rotary device which operates with improved efficiency compared to conventional rotary devices.

The present invention is also concerned with providing a system for controlling a rotary device which is able to generate electrical and/or mechanical energy.

According to the present invention there is provided a system for controlling a rotary device, the system comprising a controller and a rotary device, which has a stator and rotor, wherein the controller is connected to the rotary device to control rotation of the rotary device, and wherein the controller is adapted to periodically energise at least one energising coil of the device to create a magnetic field of a polarity which induces the rotor to rotate in a single direction and wherein the controller is switched off so as to de-energise the energising coil when other forces, being forces other than those resulting from the energised energising coil produce a resultant force which induces rotation of the rotor in the single direction.

Preferably the controller is adapted to energise the energising coil for a period during which the resultant force from the other forces acts to rotate the rotor in the opposite direction, whereby the force applied by the energising coil overcomes (is greater than) the resultant force.

The controller is preferably adapted to switch off to de-energise the energising coil before the resultant force is zero.

The controller preferably is adapted to switch off to de-energise the energising coil for a period before the resultant force is zero, and to allow back EMF induced by other forces to urge the rotor to rotate in the single direction before the resultant force is zero.

Preferably the resultant force excludes forces arising from back EMF.

The energising coil may be adapted to be energised by the controller through a predetermined angle of a complete revolution of the rotor.

Alternatively the energising coil is adapted to be energised by the controller for a predetermined period of time for each revolution of the motor.

Preferably the/each energising coil is energised more than once during a single revolution (cycle) of the rotor.

The/each or at least one energising coil may be energised each time the resultant force applies a force to the rotor in the opposite direction.

The/each or at least one energising coil may be energised by a periodic pulse applied by the controller.

The periodic pulses are preferably all of the same sign.

The/each or selected ones of the energising coils are energised whenever the resultant force is in the opposite direction and then for a period less than the period during which the resultant force changes from zero to a maximum and back to zero.

According to one embodiment the stator has the at least one energising coil.

The rotor may have at least one magnetic field generating means which is able to generate a magnetic field which interacts with the magnetic field generated by the/each energising coil when energised, to apply a force to rotate the rotor in one direction.

The/each energising coil preferably includes a magnetic interaction means which is adapted to either repel or attract the magnetic field generating means.

According to another embodiment the magnetic interaction means is adapted to attract the magnetic field generating means.

The magnetic interaction means may comprise a ferrous body or body of another substance which is attractable to a magnetised body.

The magnetic field generating means may be a permanent magnet.

The magnetic interaction means may be an iron core or a permanent magnet.

Preferably the magnetic field generating means comprises a permanent magnet, or member attractable to a magnetised body.

The stator preferably comprises a plurality of energising coils evenly spaced around the rotor.

Each energising coil is preferably an electromagnet.

Preferably the or each energising coil includes the magnetic interaction means through its coil.

Preferably the rotor comprises a plurality of evenly spaced magnetic field generating means.

According to one embodiment the rotor comprises a plurality of evenly spaced permanent magnets.

The evenly spaced permanent magnets may all be of the same polarity.

The evenly spaced magnetic field generating means may be energisable coils simulating magnets.

Preferably the poles of the magnetic field generating means are all the same.

The magnetic poles produced by energised energising coils may be the same as that for the magnetic field generating means.

According to an alternative embodiment an alternating pattern of poles for the energising coils is provided.

According to another embodiment an alternating pattern of permanent magnets is provided for the rotor.

According to a further embodiment of the present invention the stator has a plurality of magnetic flux generating means.

The magnetic field generating means for the stator may be permanent magnets.

Preferably the rotor comprises a plurality of energising coils and a commutator.

The rotor may be an armature and the stator may be a field winding.

Preferably the rotor magnetic field generating means is energised by an external power supply being DC or AC current.

The stator magnetic interaction means may be energised by coils operating on AC or DC current.

According to one embodiment the stator includes at least one induction coil which is adapted to have a current induced therein by the magnetic field generating means of the rotor.

The/each induction coil may be separate from the/each energising coil.

The/each induction coil may also be the energising coil.

The/each energising coil may be adapted to be connected to an output circuit whereby current induced in the/each energising coil is output to the output circuit.

It is preferred that switching circuitry is adapted to rectify current induced in the induction coils.

It is preferred that the rectifying occurs just before the or each energising coil is energised by the power supply.

Preferably current output to the output circuit is adapted to be used to run an electric device.

The controller preferably comprises a switching circuit which is adapted to connect the/each energising coil to an output circuit when no current is generated to energise the energising coil.

Preferably the controller provides a switching circuit.

The controller may be a rotary switch.

The rotary switch may have at least one contact which is aligned with the/each magnetic field generating means.

Preferably the rotary switch has at least one contact aligned with the permanent magnets of the rotor.

The rotary switch may have the same number of contacts as the number of Magnetic field generating means; being magnets in their preferred form.

The/each contact may have a width that varies with vertical height.

The rotary switch preferably comprises adjustable brushes which are able to be moved vertically.

The contacts preferably taper in width from a top end to a bottom end thereof.

The rotary switch and rotor may be located on coaxial central axis.

The rotary switch and rotor may be mounted on a common axial.

Preferably the rotor switch is mounted in a separate chamber from the rotor.

According to one embodiment each energising coil is adapted to repel an adjacent magnetic field generating means when energised.

Each energising coil may be adapted to be energised by back EMF only for a predetermined period of each cycle.

The predetermined period preferably occurs after current to the energising coil is switched off.

According to a further embodiment the/each energising coil is adapted to attract the magnetic field generating means of the rotor.

The present invention contemplates a number of variations to the components making up the systems described above. For example the current, voltage, magnetic field generated, the number of poles of magnets for the rotor/stator may all vary and accordingly will effect the timing of switching of energising coils.

The rotary device may have a greater number of magnetic poles generated on the stator/field winding than in the rotor/armature or vice versa.

According to one embodiment the number of poles on both of these are the same.

It is preferred that the switching of the energising coils which is controlled by the controller is adapted to maximise the influence of back EMF produced.

It is preferred that the energising coils are effectively provided with a pulsed electric current of minimum duration, which duration is enough to maintain rotation of the rotor and produce a desired output of torque or current.

BRIEF DESCRIPTION OF THE DRAWINGS

Preferred embodiments of the present invention will now be described by way of example only with reference to the accompanying drawings in which:

FIG. 4b shows a schematic view of the rotary device shown in FIG. 4a;

FIG. 5 shows a graphical representation of force versus angular position of permanent magnet M1 of the system shown in FIG. 4a;

FIG. 6 shows a series of four graphs of input current versus angular movement of each permanent magnet of the system shown in FIG. 4a;

FIG. 7 shows a graphical representation of input voltage versus input current for each coil of the rotary device shown in the system of FIG. 4a;

DETAILED DESCRIPTION OF THE DRAWINGS

Figure 4A:
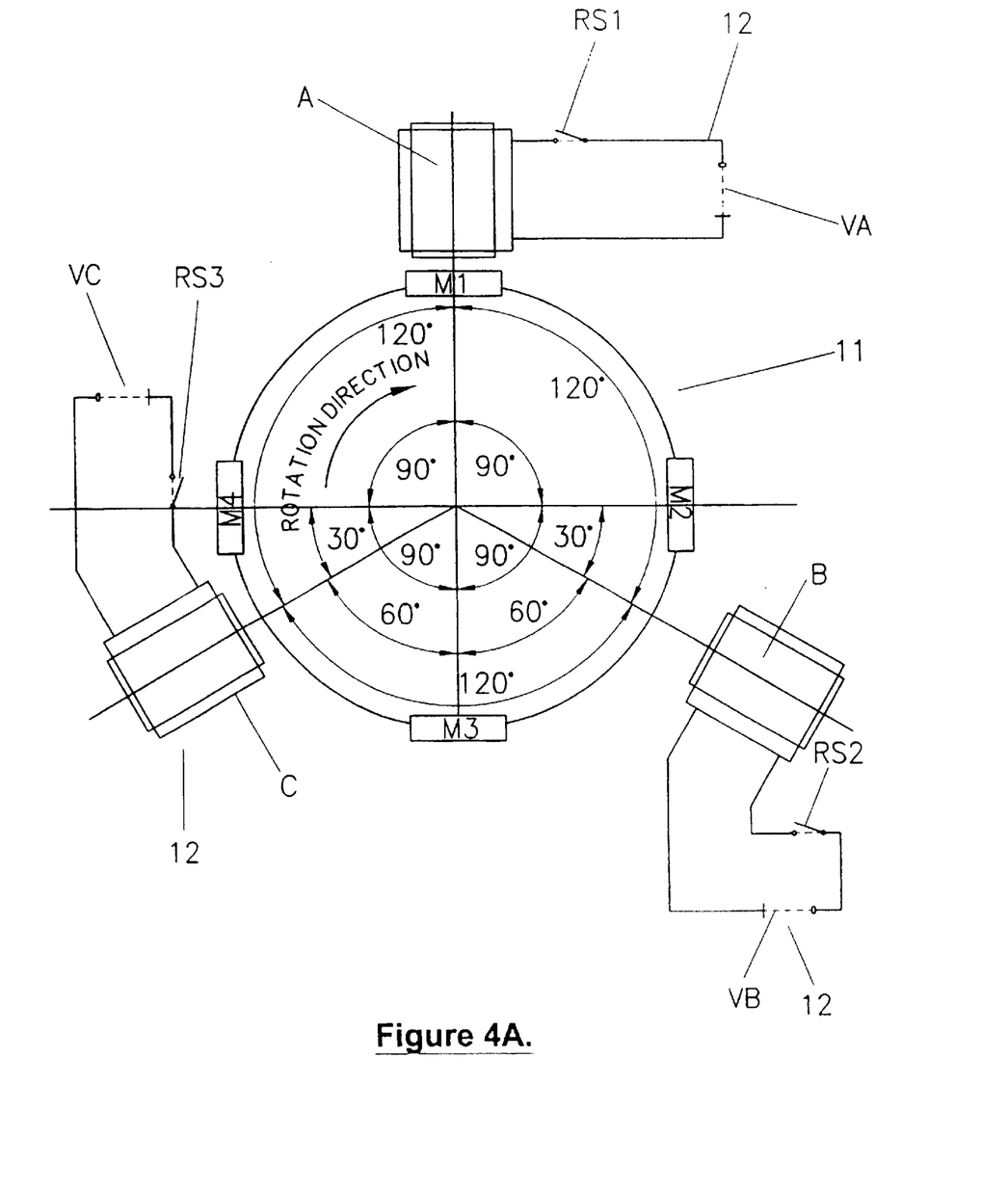
FIG. 4a shows a schematic view of a system for controlling rotary device in accordance with the first embodiment of the present invention.
Figure 4B:
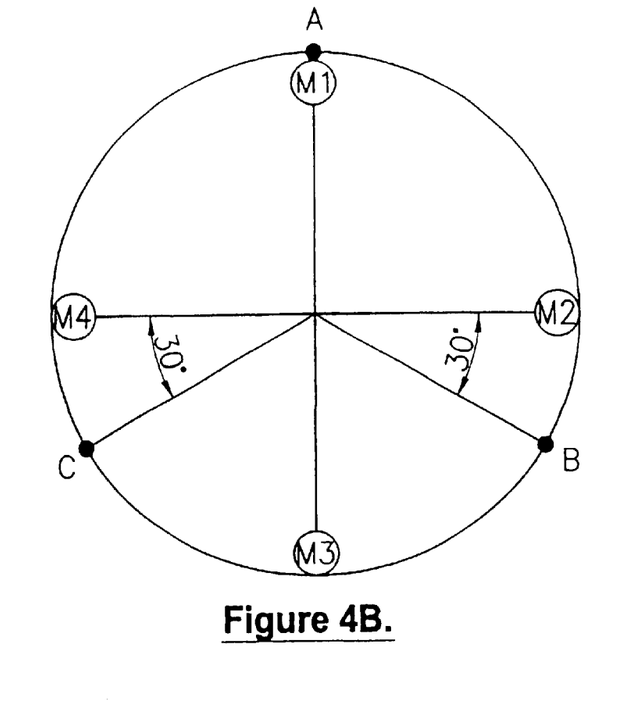

As shown in FIG. 4a according to the first embodiment of the invention a system is provided consisting of a rotor 11 having four permanent magnets M1, M2, M3 M4 which are evenly spaced at 90° with respect to each other.

The system includes a stator 12 consisting of three electromagnet energising coils A, B, C which are spaced 120° apart from each other.

Each coil A, B, C is connected in circuit with a power supply of 54 volts and a switch RS1, RS2, RS3.

Figure 1:
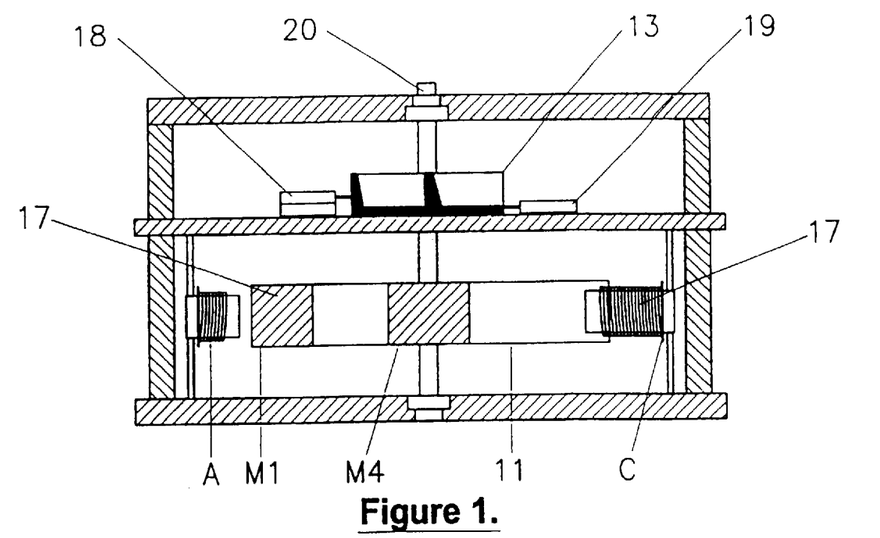
FIG. 1 shows a cross-sectional front view of a rotary device an a control therefore in accordance with a first embodiment of the invention.
Figure 2:
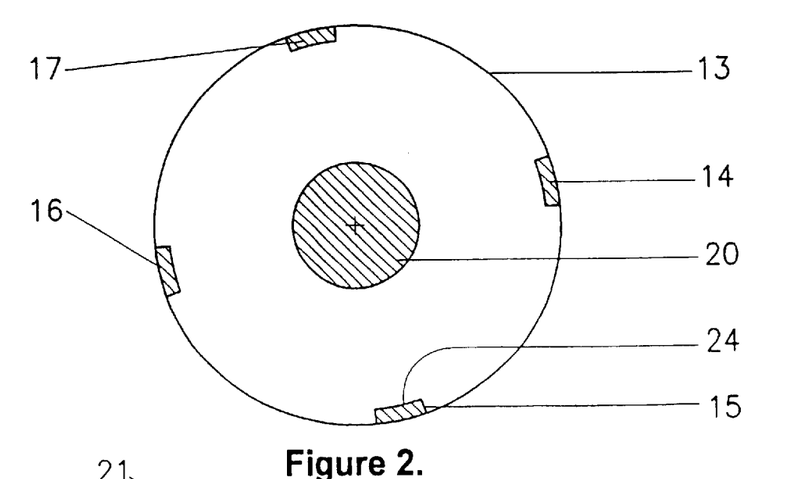
FIG. 2 shows a top view of the controller shown in FIG. 1.
Figure 3:
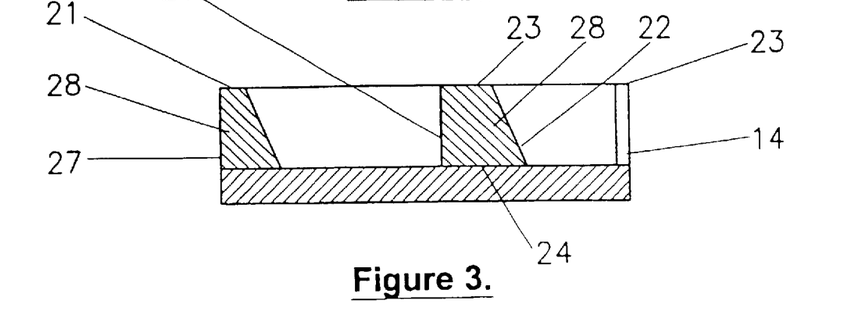
FIG. 3 shows a side view of the controller shown in FIG. 1.

Each of the contacts RS1, RS2, RS3 are part of a rotary switch 13 having contacts 14, 15, 16, 17 which are spaced apart at 90° with respect to an adjacent contact.

The rotary switch 13 is provided with contact brushes 18, 19 and is mounted on an axle 20 which is the same or common with the axle of the rotor 11.

Each of the contacts 14, 15, 16, 17 is specially configured with a trapezoidal shape, with the two non-parallel sides consisting of a straight side 21, and a tapered side 22 which tapers outwardly from top side 23 to bottom side 24.

The result is that each contact increases in a width moving from the top side to the bottom side 24.

The brush 18 is able to be moved vertically relative to the contacts 14, 15, 16, 17 while the brush 19 is in constant contact with the base.

Although FIG. 1 only shows the rotary switch 13 having a single series of four contacts 14, 15, 16, 17, for the three coil stator shown in FIG. 4a there would in fact be preferably three contact discs on the axle 20.

Each contact disc would have contacts for a respective one of the coils A, B, C, but each brush for the other discs would be offset by 30° and 60° respectively.

A description of the operation of the system shown in FIGS. 1 to 4a will now be set forth below.

If it is assumed that the magnets M1, M2, M3 M4 are initially aligned as shown in FIG. 4a with magnet M1 opposite one end of coil A, coil A is energised whenever one of the magnets M1 to M4 is aligned opposite it and for a predetermined time after the permanent magnet has passed it.

Figure 6:
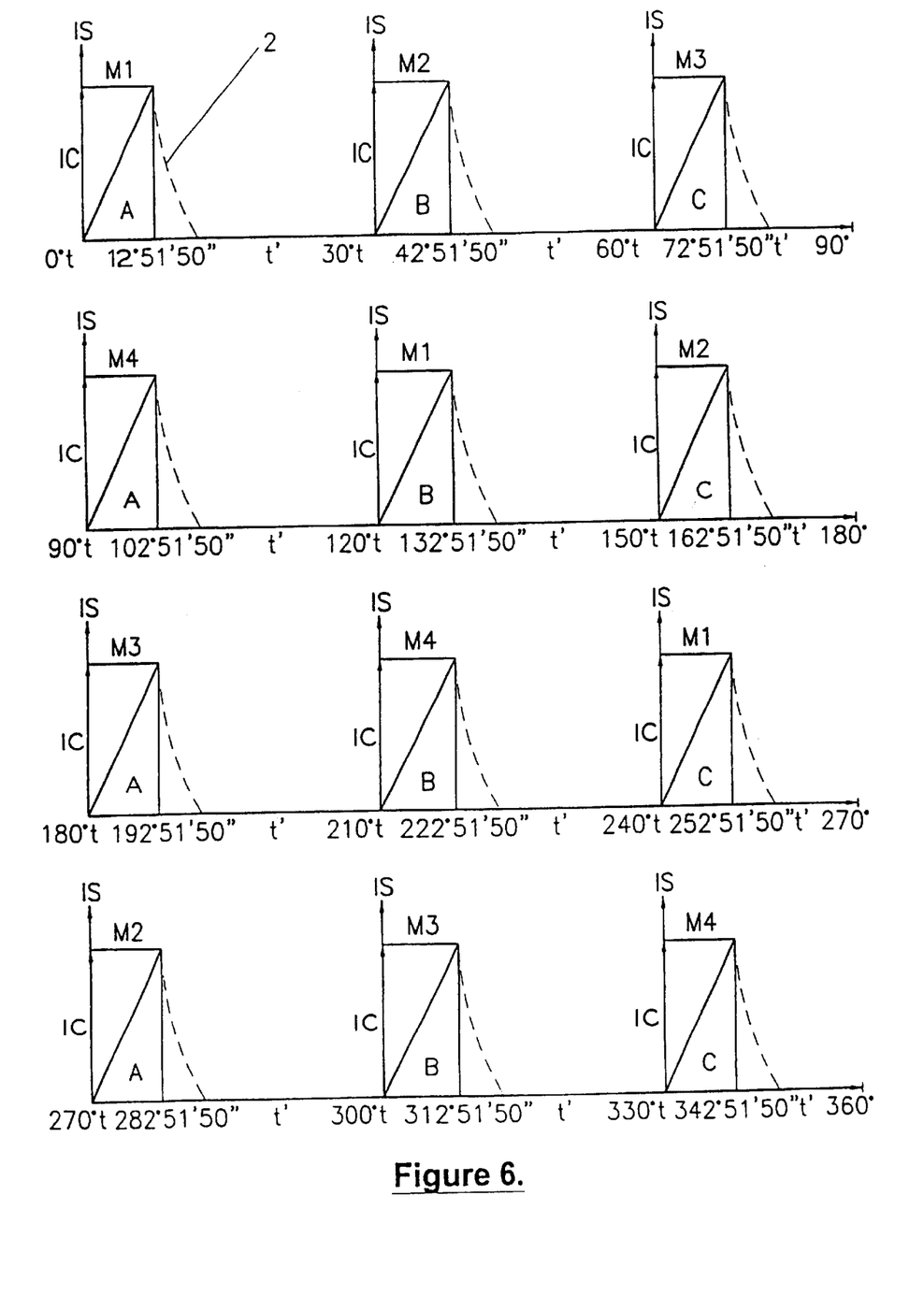

As shown in FIG. 6 coil A is energised by contact RS1 providing an electrical connection through the rotary switch 13.

This occurs by one of the contacts 14 to 17 being aligned in contact with brush 18. At this time current is applied from the power source VA and continues to be applied until the brush 18 is no longer in contact with one of the contacts 14 to 17.

For the three coil/four pole arrangement of the first embodiment it is preferred that the brushes are moved to a vertical position where the width of each contact is sufficient for each of the switches RS1, RS2 and RS3 to be closed for 12° 51', 50" of the rotation of the rotor 11. After this time the switches RS1 to RS3 are open and no more current is delivered to any one of the coils A to C. When the current to each of the coils is switched off a back EMF is induced in each of the coils A to C and thin back EMF represented by item Z results in current being maintained in each of the coils for an additional small period of tire after the contacts RS1 to RS3 are opened.

By switching the coils A to C in the above manner the rotor 11 can be induced to rotate with a lower amount of input current to the stator than would be required if current was delivered constantly to the coils A to C.

Table 1 below shows the resultant force on the rotor 13 for angular positions of the magnets M1 to M4 for angular displacements of magnet from 5° to 30°.

TABLE 1

| M1 | 5° CC | 10° CC | 15° CC | 20° CC | 25° CC | 30° CC |
|----|-------|--------|--------|--------|--------|--------|
| M2 | 25° CW | 20 CW | 15 CW | 10 CW | 5° CW | 0° |
| M3 | 55° CW | 50° CW | 45° CW | 40° CW | 35° CW | 30° CW |
| N4 | 35° CW | 40 CC | 45° CC | 50° CC | 55 CC | 60 |
| RF | CC | CC | 0 | CW | CW | 0 |

As shown when the magnets of the rotor 13 are rotated 50 at a time the resultant force on the rotor changes from a counter clockwise force from 5° to 15° to a clockwise force from 15° to 30°.

At 0°, 15° and 30° the resultant force on the rotor is 0 so that if the permanent magnets of the rotor were aligned in any of these orientations there would be no resultant force to urge the rotor either clockwise or anti clockwise.

Figure 5:
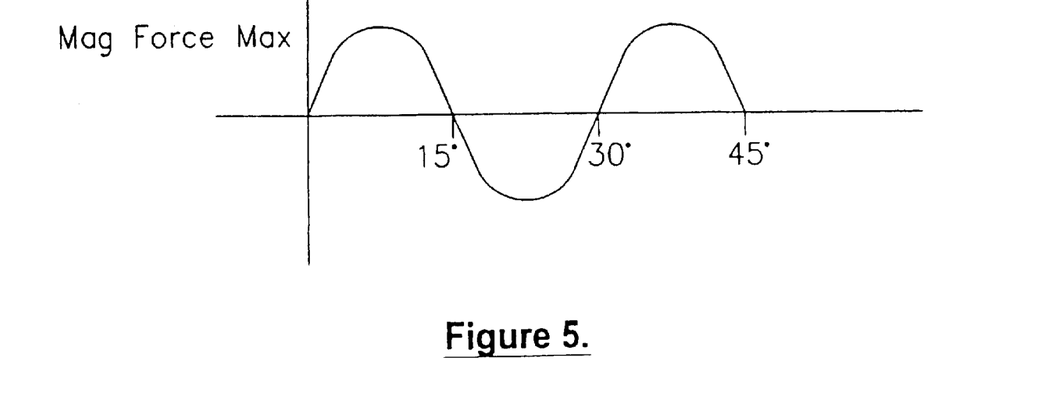

As shown in FIG. 5 a plot of magnitude of resultant force applied to the rotor against angular displacement of the rotor shows a sinusoidal curve having a cycle of 30°.

For a full 360° rotation of the rotor the rotor would experience 12 cycles of variation in resultant force.

What Table 1 and FIG. 5 shows is that unless an additional force is applied to rotate the rotor clockwise or anticlockwise the rotor will not be able to spin continuously in either direction.

If it is assumed that it is desired to rotate the rotor clockwise, then the force must overcome the counterclockwise resultant force which occurs from 0 to 15°, 30° to 45°, 60° to 75° etc through the whole 360° rotation of the rotor.

Because each of the coils A to C has an iron core even when the coils are unenergised the natural magnetic attraction occurring between each magnet and the iron cores results in each magnet M1 to M4 attempting to move in a direction to the closest iron core.

Whenever a magnet is opposite an iron core the magnetic attraction is greatest and there is no force applied by that magnet to move the rotor either clockwise or counterclockwise. Likewise when a magnet is positioned midway between adjacent iron cores, there is also a resultant force of 0 which translates to no resultant force being applied to the rotor to rotate it in either direction by that magnet.

As shown in FIG. 5 and Table 1 if magnet M1 is moved clockwise 5° there is a natural attraction between the magnet M1 and iron core of coil A to pull the magnet M1 in a counter clockwise direction. If the resultant forces applied by the other magnets were sufficient to overcome the attraction between permanent magnet M1 and the iron core of coil A the rotor would still manage to move clockwise.

However as shown in Table 1 the angular position of the other magnets M2 to M4 results in an overall counter clockwise resultant force To overcome the resultant force it is necessary to produce a pole X at coil A of like polarity to magnet M1 and thus repel M1 away from coil A.

As shown in FIG. 5 the strength of the magnetic repelling action between coil A and M1 must be sufficient to overcome the resultant force urging the rotor counter clockwise.

A current could be applied to the coil A for an angular displacement of 15° of magnet M1, but it is preferred that coil A be energised only for 12°, 51', 50" angular displacement of magnet M1. By applying current to coil A for this period of angular displacement a minimum amount of current is applied to coil A in order to overcome the resultant force counter clockwise which occurs for 0° to 15° of angular displacement of magnet M1.

Although current to coil A can be applied for longer than this period it has been discovered that by applying current for this period a back EMF is induced in coil A which adds to the repulsive force applied to magnet M1 by coil A.

Every time one of the magnets M1 to M4 is aligned at 0° with coil A coil A is energised for 12°, 51', 50" of angular displacement of that magnet. Thus as shown in FIG. 6 current ends up being applied to coil A at 0° to 12°, 51', 50", 90° to 102°, 51', 50", 180° to 192°, 51', 50" and 270° to 282°, 51', 50".

A similar switching pattern is applied to coils B and C. For example coil B is energised when magnet M2 has moved 30° to when it has moved 42°, 51', 50" and likewise coil C is energised when magnet M3 has moved 60° to 72°, 51', 50".

It is preferred that the rotor has a diameter of 230 mm and that each coil has a resistance of 6.8 ohms.

Figure 7:
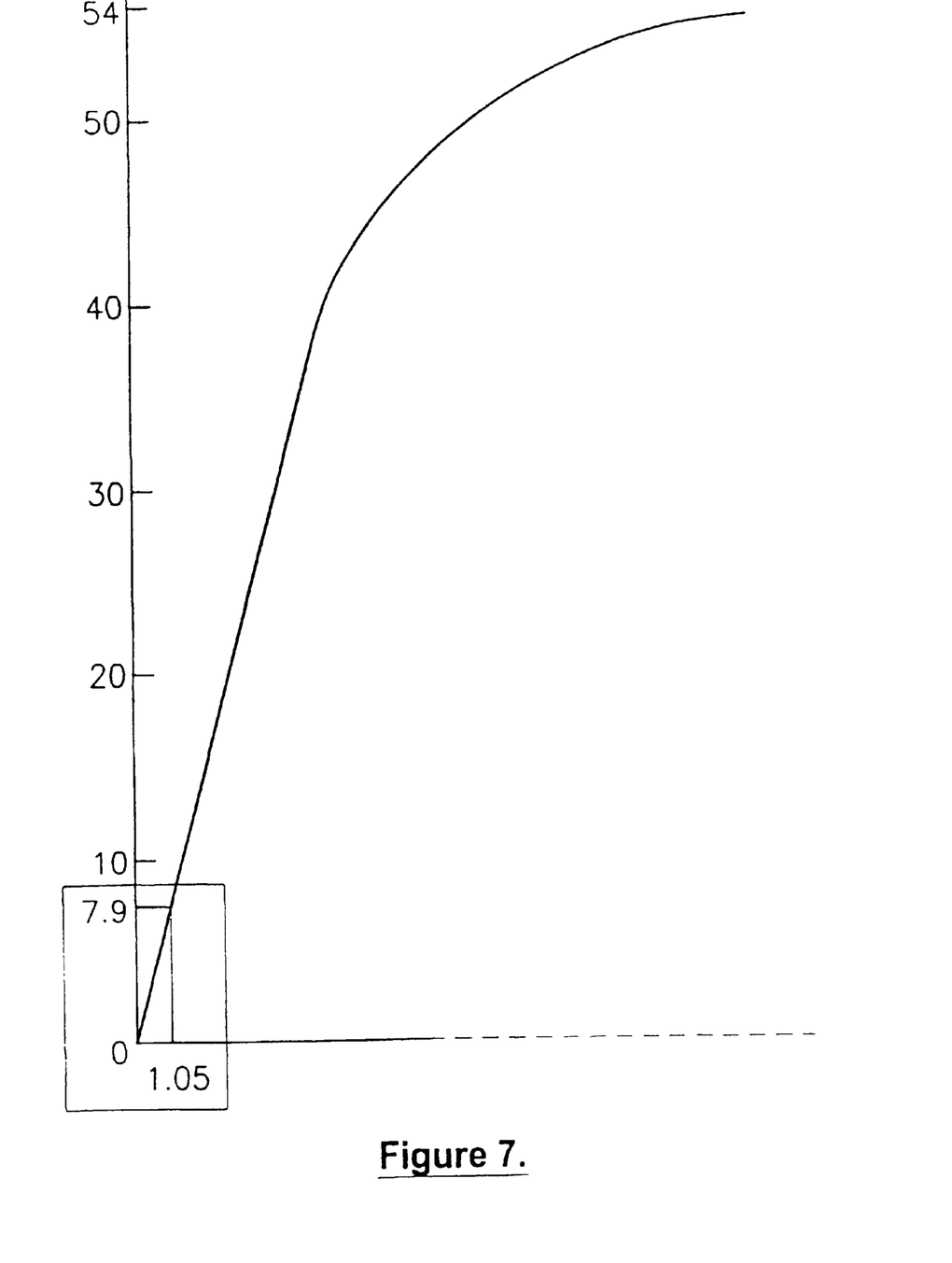

FIG. 7 shows a graphical representation of input voltage versus input current for a coil resistance of 6.8 ohms and for a four pole rotor which is 230 mm in diameter.

The exact timing sequence for switching coils on and off will vary depending on the parameters of the rotary device and the controller.

Accordingly by varying the input voltage, coil resistance and overall impedance of the input circuit for each coil the duration during which a coil must be turned on will change.

In fact there are many factors which can change the timing sequence of switching on the coils and some of these are summarised below.

The Stator

The variables include the choice of material used in constructing the stator iron core, the number of stator iron cores and their positioning as well as the physical size, section area and shape of the stator iron cores.

Rotor

The physical size and magnetic strength and shape of the polarised permanent magnetic body as contained in the rotor, the number of polarised permanent magnetised bodies being contained in the rotor, the positioning and spacing of the same, the use of all like polarities of permanent magnetic bodies or the use of alternating polarities for the permanent magnetic bodies.

Stator Coil

The physical size of the coils being positioned onto the stator iron core(s), the type of wire used to wind the coil(s) such as copper, silver, aluminum or others. The shape and section areas of the winding wire, such as round, square, triangular, rectangular and others; the number of turns and layers wound onto the coil and consequent ohms resistance; the method of winding onto a coil holder, single winding, double winding, double winding same direction, double winding opposite direction, left to right or vice versa, interwoven winding, whether the above examples would be wound onto a single coil holder.

Speed of Rotor

This can be controlled by the length of the directed (input) DC current (on and cut off period) and/or the control of the supply voltage used to supply the stator coil(s).

Other variations that may be made to the system include the following:

a. The coils can be connected in series, parallel, or series parallel.

b. It is only when the north/south arrangements of the permanent magnets are used in the rotor that even numbers of permanent magnets are necessary, but not necessarily even numbers of pairs of stator coils positioned in the stator. Furthermore the direction DC current Supplied to the stator coils in the north south arrangement above must be synchronised, meaning that the magnetic field as needed in the stator coil(s) must be of corresponding polarity to the stator coil(s), iron core end, which faces the permanent magnets.

c. When using permanent magnets which are all of the same polarity, then any number of permanent magnets in the rotor may be used providing there is sufficient room to contain them at even spacings on the rotor.

d. The spacings between the permanent magnets must be exact, if too close to each other the directed DC current will become less effective, if too far apart the full potential will not be obtained.

e. It is possible to have various combinations of permanent magnet and stator coil iron cores similar but not restricted to the following:
   i. Three magnets in the rotor, one to three stator coils can be used.
   ii. Five permanent magnets in the rotor, one to five stator coils can be used.
   iii. Nine permanent magnets in the rotor one to three or nine stator coils can be used.
   iv. The output varies with each combination.
   v. Regardless of the rotor containing even or uneven numbers of permanent magnets the stator can operate with only one stator coil and stator iron core and still be highly efficient but with reduced total output.

f. The stator and rotor should be made from non magnetic materials like wood, plastic, bronze and similar non-magnetic materials.

Although switching is performed in its preferred form by a mechanical rotary switch, it can also be performed by solid state electronics or other switching devices.

The length of the on period for each coil is the physical length ratio. When the brushes are in contact with the conductive part of the rotary switch and the non-conductive part.

This ratio is referred as the frequency or number of ratios in one second.

The output produced by the rotary device can be mechanical and electrical at the same time or may be mainly electrical or mainly mechanical. The reason for this will be explained with reference to the second embodiment in which it is assumed the stator has a single energising coil with an iron core and the rotor has a single permanent magnet.

When the rotors permanent magnet is rotated very slowly by hand in the clockwise direction it is possible to determine the point where the natural magnetic attraction between the rotors permanent magnet and the stators iron core occurs.

Figure 8:
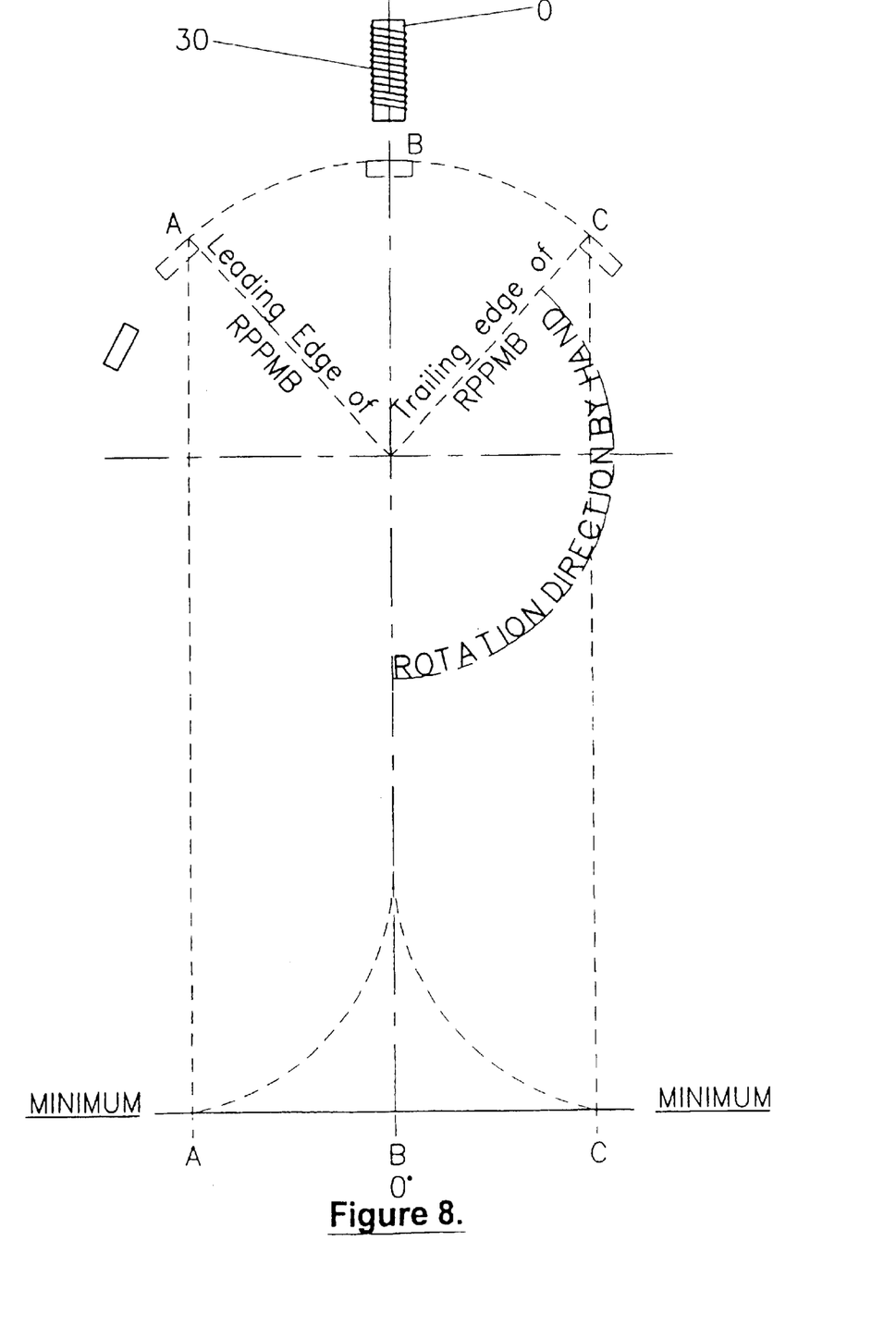
FIG. 8 shows a schematic diagram of variation of natural magnetic attraction versus angular displacement of a rotor having a single permanent magnet and a stator having a single energising coil, in accordance with a second embodiment of the present invention.

When the leading edge of the permanent magnet has reached point A as shown in FIG. 8, the natural magnetic attraction begins and increases exponentially until the centre of the permanent magnet is aligned at point B opposite the iron core 30.

If the permanent magnet is rotated away from point B the NMA will be at a maximum point at point B and then decrease from maximum exponentially until the trailing edge of the permanent magnet has reached point C and then ceases.

Figure 9:
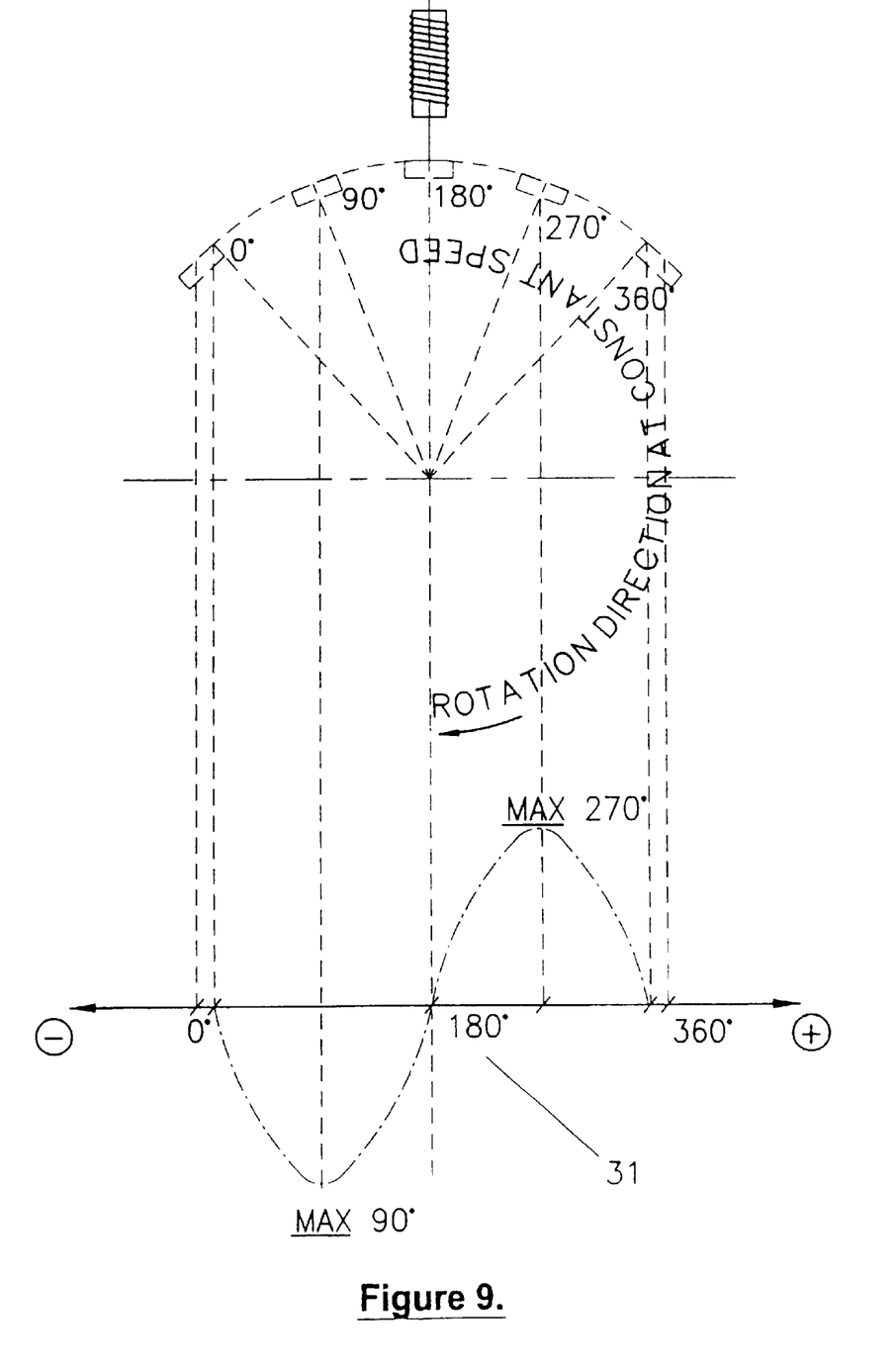
FIG. 9 shows a graphical representation of magnetic field versus angular displacement in accordance with the second embodiment of the present invention.

When the rotor is moved clockwise at a constant speed and an oscilloscope is connected to the stator coil it is possible to observe the movement of the permanent magnetic between point A and point B and then between point B and C as shown in FIG. 9.

An induced induction curve is then apparent on the oscilloscope and this induced induction produces a sine wave curve 31. Furthermore the induced induction between point A to point B is a negative going induced induction in this instance and the induced induction between point B and point C is a positive going induced induction in this instant.

It is also noted that the negative going and positive going induced induction curves are exactly the same but opposite to each other.

When the permanent magnet begins to induce a negative going induction in the stator coil at 0° of the sine wave curve 31, the induction induced is then at 0. At 90° degrees of the sine wave curve the induced induction is at a maximum and then goes back to 0 when the permanent magnet is aligned with point B, or at 180° of the sine wave curve, when the permanent magnet starts to move away from its alignment with point B or is at 180° of the sine wave curve.

When the permanent magnets start to move away from its alignment with point B and is moving towards point C the now positive going induced induction is first at 0 at 180° of the sine wave curve, then at a maximum of 270° of the sine wave curve and then back to 0 at 360° of the sine wave curve.

It should be noted that 0° and 360° a of the sine wave curve are not necessarily the same as point A for 0° and point C for 360° of the sine wave curve.

Points A and C are determined by the strength of the rotors permanent magnet and the section area and/or shape of the stator iron core.

The negative going induced induction between 0° and 180° of the sine wave curve produces an electro-magnetic force in the stator coil and iron core of opposite polarity.

Figure 10:
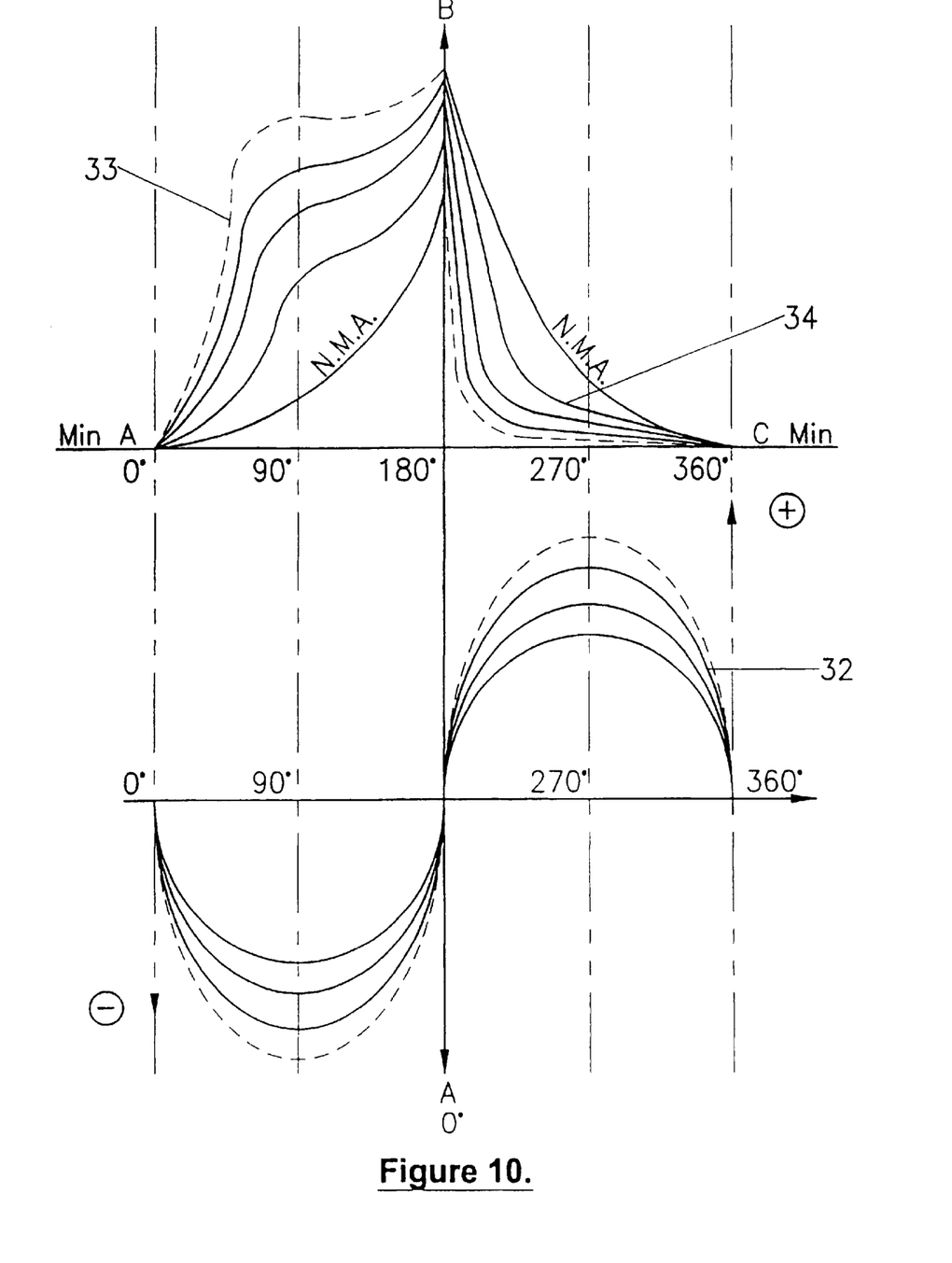
FIG. 10 shows a graphical representation of induced induction versus angular displacement of the permanent magnet in accordance with the second embodiment of the present invention.

The iron core end facing the rotor is of opposite polarity than the permanent magnet in this instance, as shown in FIG. 10.

The positive going induced induction between 180° and 360° of the sine wave curve produces an electro-magnetic force in the stator coil and iron core of the same polarity in the iron core end facing the rotor, being of the same polarity as the permanent magnet in this instance.

When the permanent magnet reaches point A the natural magnetic attraction between the permanent magnet and the stator iron core is at is minimum and starts to move toward point B. When the induced induction then also starts to occur at 0° of the sine wave curve, being somewhere between point A and point B, the natural magnetic attraction has already increased.

When the permanent magnet is at 0° of the sine wave curve and is moving towards point B or 180° of the sine wave curve, the negative going induced induction in the stator coil is producing an electro-magnetic force (field) in the stator iron core with the iron core end facing the rotor being of an opposite polarity than the permanent magnet and is at zero effect at 0° of the sine wave curve, than at maximum effect at 90° of the sine wave curve and then back to zero effect at 180° of the sine wave curve.

The permanent magnet is then aligned at point B. There the magnetic attraction force is proportional with the distance and this increases exponentially when moving from A towards point B. There the stator iron core is fixed and stationary at point B. Accordingly it will be the permanent magnet that moves towards point B.

As an example if the stator iron core was also a polarised permanent magnetic body of the same strength but of opposite polarity to the permanent magnet, the magnetic attraction force would be at least four times greater because of the distance factor as explained earlier.

Furthermore, this would also occur because of the doubling of the magnetic force between the magnetic north and south arrangement. It follows therefore that the magnetic attraction between the permanent magnet and the iron core end facing the rotor increases dramatically when the induced induction in the stator coil produces an electro-magnetic force of the opposite polarity at the stator iron core end facing the rotor as described above.

The increase follows the sine wave curve starting from 0° to 90° of the sine wave and the above effect decreases form 90° back to 180° of the sine wave curve.

A combination curve of the natural magnetic attraction and the induced induction in the stator coil, producing an electro-magnetic force at the stator iron coil end facing the rotor of opposite polarity 33 is shown in FIG. 10 from 0° to 180°. For 180° to 360° the stator iron coil and rotor of like polarities 34 are shown.

When the permanent magnet is aligned at point B and a direct current is supplied to the stator coil for only a short period starting at point B then the DC current is applied only long enough to overcome the natural magnetic attraction between permanent magnet and the stator's iron core end facing the rotor. The directed DC current as supplied to the stator coil is producing a like-polarity at the iron core end facing the rotor and thus is repelling the permanent magnet away from point B towards point C.

The natural magnetic attraction has thus changed to natural magnetic repulsion due to the like-polarity of the stator iron core end facing the rotor.

The length of the "on" period has to be sufficient to overcome the natural magnetic attraction and could be as long as until the trailing edge reaches point C where the natural magnetic attraction ceases. However there the positive going induced induction in the stator coil as produced by the permanent magnet produces an electro-magnetic force in the stator or iron core end facing the rotor, producing a like polarity as the permanent magnet starting at 180° of the sine wave curve or point B and zero at that instant. At 270° of the sine wave curve, it is at a maximum and then ends up at zero at 360° of the sine wave curve. In other words at 270° of the sine wave the force is at maximum repulsion and there is induced induction in the stator coil depending on the speed of the rotor. The effect of variation on the speed of the rotor is shown by curves 35 in FIG. 11.

Figure 11:
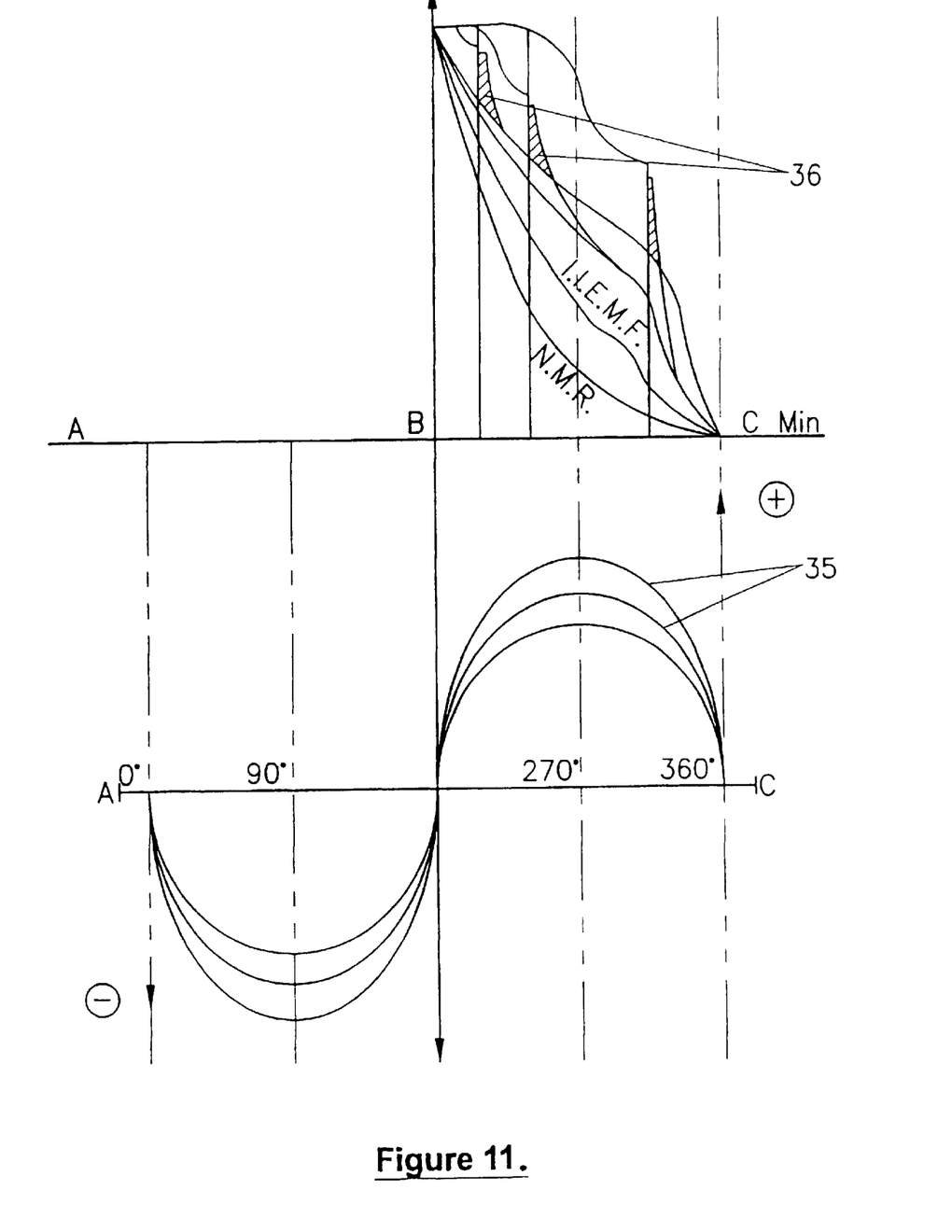
FIG. 11 shows a further graphical representation of induced induction electro-magnetic force versus angular displacement of the permanent magnet in accordance with the second embodiment of the present invention.

As shown in FIG. 11 regardless of the speed of the rotor the induced induction in the stator coil is at a maximum at 270° of the sine wave curve.

The on period can be brought back to the point where the induced induction is great enough to carry the electro-magnetic repulsion through to 360° of the sine wave curve and beyond point C. Therefore the greater the rotor speed the shorter the on period of the input DC current has tube due to the high induced induction in the stator coil as explained earlier. When the "on" period is switched off it is called the "cut-off" point. From the cut-off point to 360° of the sine wave curve the repulsion is produced by back EMF the induced induction in the stator coil as previously explained.

During the on period, the magnetic repulsion force produced between the stator iron core at point B and the permanent magnet can be viewed as a combined repulsion force. Some of this force is produced by natural magnetic repulsion of the permanent magnet and some by the input DC current as supplied to the stator coil. Therefore if the induced magnetic force as produced by the input DC current in the stator coil is made equal to that of the permanent magnet with the same polarity, then half of this repulsion force between the on period and the cut-off point, in this instance, is from the natural magnetic repulsion of the permanent magnet as a reaction to the induced magnetic force as supplied by the input DC current to the stator coil.

The input DC current as supplied to the stator coil produces the magnetic repulsion force and is the only outside input to the overall system for total movement between point A and point C.

The total input can be summarised as:

a. The combined natural magnetic attraction and the electro-magnetic force as produced by the induced induction in the stator coil between point A to point B.

b. The combined magnetic repulsion force between the permanent magnet and the stator iron core facing the rotor during the on period and the cut-off point.

c. The electro-magnetic repulsion (see induced induction as explained earlier) between the cut-off point and point C.

d. The electro-magnetic repulsion produced by the back EMF as represented by shaded portion 36 of FIG. 11.

According to another embodiment of the present invention the stator has two coils positioned at 180° with respect to each other and the rotor has three permanent magnets spaced at 120° apart.

As set out in Table 2 below from 0 to 30° the resultant force urges the rotor counter clockwise. At 30° the resultant force is 0 and from 30° to 90° the resultant force is clockwise. From 90° to 120° the resultant force is counter clockwise. This completes a full cycle which is repeated three times throughout a 360° rotation of the rotor.

TABLE 2

| M1 | 5° C. | 10° CC | 15° CC | 20° CC | 25° CC | 30° CC |
|---|---|---|---|---|---|---|
| M2 | 55 CW | 50 CW | 45 CW | 40 CW | 35 CW | 30 CW |
| M3 | 65 CC | 70 CC | 75 CC | 80 CC | 85 CC | 90 |
| RF | CC | CC | CC | CC | CC | 0 |

With the above configuration of poles and coils if it is desired to move the rotor clockwise, current would need to be supplied to the coils of the stator to overcome the counter clockwise force whenever this is counter clockwise, but as explained previously, current does not need to be supplied to the coil to energise the coil for the full period during which the resultant force is counter clockwise.

For convenience and ease of explanation the above embodiments have been restricted to permanent magnets on the rotor and coils on the stator However the basic concept behind the invention does not change if the permanent magnets are replaced by coils which are energised to produce the appropriate magnetic poles.

Similarly for an AC rotary device a rotating magnetic field generated by the stator winding or by the rotor/armature winding could similarly be switched to reduce the amount of current required to maintain rotation of the motor in one direction and to maximise the influence of back EMF on maintaining rotation of the motor in a single direction.

The above principles also apply to generators where coils are energised to produce a magnetic field. In such a situation the coils are switched on for a time sufficient to maintain rotation in the single direction and to maximise the influence of back EMF which tends to maintain rotation of the rotor/armature in a single direction.

By using the above concept it is possible to produce an output which can be both mechanical and electrical at the same time. Current generated in the stator coil windings can be used as an output and likewise the torque generated by the rotor can be used to supply a mechanical output. Likewise only one or the other form of output may be utilised.

What is claimed is:

1. A system for controlling a rotatable device, the system comprising a controller and a rotary device, which has a stator and rotor, wherein the controller is connected to the rotary device to control rotation of the rotary device, and, wherein the controller is adapted to periodically energise at least one energising coil of the device to create a magnetic field of a polarity which induces the rotor to rotate in a single direction and wherein the controller is switched off so as to de-energise the energising coil, and any other energising coils, when other forces, being forces other than those resulting from the energised energising coil, and any other energising coils, produce a resultant force which induces rotation of the rotor in the single direction.

2. The system as claimed in claim 1 wherein the controller is adapted to energise the at least one energising coil for a period during which the resultant force from the other forces acts to rotate the rotor in the opposite direction, whereby the force applied by the at least one energising coil is greater than the resultant force.

3. The system as claimed in claim 2 wherein the controller is adapted to switch off input current to the energising coil before the resultant force is zero.

4. The system an claimed in claim 3 wherein the controller is adapted to switch off the at least one energising coil for a period before the resultant force is zero and to allow back EMF to urge the rotor to rotate in the single direction before the resultant force is zero.

5. The system as claimed in claim 4 wherein the at least one energising coil is adapted to be energised by the controller through one or more predetermined angles of a complete revolution of the motor.

6. The system as claimed in claim 4 wherein the energising coil is adapted to be energised by the controller for one or more predetermined periods of time for each revolution of the rotor.

7. The system as claimed in claim 5 wherein the at least one energising coil is adapted to be energised more than once during a single revolution of the rotor.

8. The system as claimed in claim 7 wherein at least one of the energising coils is energised each time the resultant force applies a force to the rotor in the opposite direction.

9. The system as claimed in claim 8 wherein at least one energising coil is energised by a periodic pulse applied by the controller.

10. The system as claimed in claim 9 wherein the periodic pulses are all of the same sign.

11. The system as claimed in claim 10 wherein the at least one of the coils is energised whenever the resultant force is in the opposite direction to the single direction and then for a period less than the predetermined period during which the resultant force changes from zero to a maximum.

12. The system as claimed in claim 11 wherein the rotor has at least one magnetic field generating means which is able to generate a magnetic field which interacts with the magnetic field generated by the energising coil when energised to apply a force to rotate to the rotor in one direction.

13. The system as claimed in claim 12 wherein the energising coil includes a magnetic interaction means which is adapted to either repel or attract the magnetic field generating means.

14. The system as claimed in claim 13 wherein the magnetic interaction means comprises an iron core of at least one of the energising coils and the magnetic field generating means comprises at least one permanent magnet.

15. The system as claimed in claim 14 including a switching circuit which is adapted to switch off the controller and connect the energising coils to an output whereby included current in the energising coils can be used.

16. The system as claimed in claim 15 wherein the controller comprises a rotary switch.

17. The system as claimed in claim 16 wherein the rotary switch comprises contacts having a cross-sectional width which varies with height.

18. The system as claimed in claim 6 wherein the at least one energising coil is adapted to be energised more than once during a single revolution of the rotor.

* * * * *